US 8,185,524 B2

(12) United States Patent
Weber et al.

(10) Patent No.: US 8,185,524 B2
(45) Date of Patent: May 22, 2012

(54) METHOD AND SYSTEM FOR LOCATING EVENTS IN-CONTEXT

(75) Inventors: Karon A. Weber, San Francisco, CA (US); Jonathan Trevor, Santa Clara, CA (US); Edward Ho, San Jose, CA (US); Samantha M. Tripodi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 573 days.

(21) Appl. No.: 11/644,851

(22) Filed: Dec. 22, 2006

(65) Prior Publication Data
US 2008/0154912 A1 Jun. 26, 2008

(51) Int. Cl.
*G06F 17/30* (2006.01)

(52) U.S. Cl. ........................ 707/724; 707/805

(58) Field of Classification Search ........... 707/1, 3, 707/9, 10; 715/513, 764, 838; 709/217–218; 705/8; 1/1, 3, 9, 10
See application file for complete search history.

(56) References Cited

U.S. PATENT DOCUMENTS

| | | | |
|---|---|---|---|
| 5,889,993 A | 3/1999 | Kroeger et al. | |
| 5,948,040 A * | 9/1999 | DeLorme et al. | 701/201 |
| 6,025,932 A | 2/2000 | Imanaka | |
| 6,604,079 B1 * | 8/2003 | Ruvolo et al. | 705/7.15 |
| 6,691,032 B1 * | 2/2004 | Irish et al. | 701/213 |
| 6,839,719 B2 | 1/2005 | Wallace | |
| 6,917,926 B2 | 7/2005 | Chen et al. | |
| 6,931,647 B1 | 8/2005 | Firth et al. | |
| 6,968,509 B1 | 11/2005 | Chang et al. | |
| 7,138,913 B2 * | 11/2006 | Mackenzie et al. | 340/539.13 |
| 7,254,569 B2 | 8/2007 | Goodman et al. | |
| 7,281,008 B1 | 10/2007 | Lawrence et al. | |
| 7,346,556 B2 * | 3/2008 | Upendran et al. | 705/26.41 |
| 7,379,889 B2 * | 5/2008 | Ratzlaff et al. | 705/8 |
| 7,398,268 B2 | 7/2008 | Kim et al. | |
| 7,437,353 B2 * | 10/2008 | Marmaros et al. | 707/3 |
| 7,441,194 B2 | 10/2008 | Vronay et al. | |
| 7,467,232 B2 | 12/2008 | Fish et al. | |
| 7,516,092 B2 * | 4/2009 | Upendran et al. | 705/26.1 |
| 7,519,566 B2 | 4/2009 | Prigogin et al. | |
| 7,539,747 B2 | 5/2009 | Lucovsky et al. | |
| 7,548,932 B2 | 6/2009 | Horvitz et al. | |
| 7,558,925 B2 | 7/2009 | Bouchard et al. | |
| 7,596,571 B2 | 9/2009 | Sifry | |
| 7,685,202 B2 | 3/2010 | Kasahara et al. | |
| 7,801,782 B2 | 9/2010 | DeAddio et al. | |
| 2001/0049617 A1 * | 12/2001 | Berenson et al. | 705/8 |
| 2002/0194388 A1 | 12/2002 | Boloker et al. | |

(Continued)

OTHER PUBLICATIONS

Non-final Office Action from U.S. Appl. No. 11/600,667, mailed Aug. 20, 2009.

(Continued)

*Primary Examiner* — Sheree Brown

(74) *Attorney, Agent, or Firm* — James J. DeCarlo; Greenberg Traurig, LLP

(57) ABSTRACT

Method and computer program product for locating events in-context over the Internet are disclosed. The method includes receiving a document from a user, wherein the document comprises one or more attributes, analyzing the one or more attributes of the document in accordance with a set of contextual information to generate one or more search terms, searching for events related to the one or more attributes of the document using the one or more search terms, and presenting the events to the user.

10 Claims, 9 Drawing Sheets

U.S. PATENT DOCUMENTS

| | | | |
|---|---|---|---|
| 2003/0200192 A1* | 10/2003 | Bell et al. | 707/1 |
| 2004/0199498 A1* | 10/2004 | Kapur et al. | 707/3 |
| 2005/0021485 A1 | 1/2005 | Nodelman et al. | |
| 2005/0044066 A1* | 2/2005 | Hooper et al. | 707/3 |
| 2005/0049933 A1* | 3/2005 | Upendran et al. | 705/26 |
| 2005/0108233 A1* | 5/2005 | Metsatahti et al. | 707/9 |
| 2005/0149858 A1* | 7/2005 | Stern et al. | 715/513 |
| 2005/0240596 A1* | 10/2005 | Worthen et al. | 707/10 |
| 2005/0273702 A1* | 12/2005 | Trabucco | 715/513 |
| 2006/0000900 A1 | 1/2006 | Fernandes et al. | |
| 2006/0179415 A1* | 8/2006 | Cadiz et al. | 715/838 |
| 2006/0271520 A1 | 11/2006 | Ragan | |
| 2006/0271827 A1 | 11/2006 | Cascaval et al. | |
| 2007/0060112 A1* | 3/2007 | Reimer | 455/414.2 |
| 2007/0171046 A1* | 7/2007 | Diem | 340/539.13 |
| 2007/0250784 A1* | 10/2007 | Riley et al. | 715/764 |
| 2007/0260567 A1 | 11/2007 | Funge et al. | |
| 2007/0299631 A1 | 12/2007 | Macbeth et al. | |
| 2008/0033840 A1* | 2/2008 | Upendran et al. | 705/27 |
| 2008/0059419 A1 | 3/2008 | Auerbach et al. | |
| 2008/0115086 A1 | 5/2008 | Rupp et al. | |
| 2008/0115149 A1 | 5/2008 | Rupp et al. | |
| 2008/0120396 A1* | 5/2008 | Jayaram et al. | 709/218 |
| 2008/0222170 A1 | 9/2008 | Farnham et al. | |

OTHER PUBLICATIONS

Final Office Action from U.S. Appl. No. 11/600,667, mailed Dec. 8, 2009.

Non-final Office Action from U.S. Appl. No. 11/600,667, mailed Jul. 21, 2010.

Final Office Action from U.S. Appl. No. 11/600,667, mailed Nov. 12, 2010.

Final Office Action from U.S. Appl. No. 11/600,359, mailed Mar. 5, 2009.

Office Action from U.S. Appl. No. 11/600,359, mailed Jun. 25, 2009.

Final Office Action from U.S. Appl. No. 11/600,359, mailed Jan. 21, 2010.

Office Action from U.S. Appl. No. 11/600,359, mailed Aug. 20, 2010.

Friedman, Nat; XIMIAN Dashboard; Jul. 25, 2003.

Sauermann, et al., "Semantic Desktop 2.0: The Gnowsis Experience", Proceedings of the 5th International Semantic Web Conference, ISWC 2006, (Nov. 5-9, 2006), pp. 887-900 http://www.springerlink.com/content/97322418h3201014/.

Liberman, H. et al., "Out of Context: Computer systems that adapt to, and learn from, context", IBM Systems Journal, vol. 39, No. 3&4 (2000), pp. 617-632 http://eee.cse.nd.edu/~cpoellab/teaching/cse40827/papers/context1.pdf.

Chirita, P., et al. "Activity Based Metadata for Semantic Desktop Search" Proceedings of the Second European Semantic Web Conference, (May 29-Jun. 1, 2005), pp. 439-454 http://www.springerlink.com/content/q3yrwa5e1vklj33v/.

Liberman, H., Autonomous Interface Agents, Proceedings of the SIGCHI conference on Human factors in computing systems (CHI '97). ACM, New York, NY, USA, (1997), pp. 67-74. http://portal.acm.org/ft_gateway.cfm?id=258592.

Microsoft Corp., "Introducing the Microsoft Office Information Bridge Framework" (May 2004) pp. 1-9 http://msdn.microsoft.com/en-us/library/aa679800(office.11,printer).aspx Sep. 8, 2010.

Microsoft Corp., "Technical Overview of Information Bridge Framework" (May 2004), pp. 1-16 http://msdn.microsoft.com/en-us/library/aa679802(office.11,printer). Sep. 8, 2010.

Maxson, C., "Building User Interfaces with the Information Bridge Framework" (May 2004), pp. 1-11 http://msdn.microsoft.com/en-us/library/aa679799(office.11,printer). Sep. 8, 2010.

Dey, A.K., "Context-Aware Computing: The CyberDesk Project," American Association for Artificial Intelligence '98 Spring Symposium, Standford University (Mar. 23-25, 1998), pp. 51-54 http://www.aaai.org/Papers/Symposia/Spring/1998/SS-98-02/SS98-02-008.pdf Sep. 8, 2010.

Kim, P.; Podlaseck, M.; Pingali, G., "Personal Chronicling Tools for Enhancing Information Archival and Collaboration in Enterprises" CARPE'04 (Oct. 15, 2004), New York, New York, pp. 56-65 http://portal.acm.org/ft_gateway.cfm?id=1026662 Sep. 8, 2010.

Microsoft Computer Dictionary, 5th edition ( 2002), pp. 198-199.

IEEE 100 The Authoritative Dictionary of IEEE Standards Terms, 7th edition (2000), p. 398.

Ames, M.; Dennis, T.; Hill, B.; Poon, S.; Wooldridge, M. PicturePortal Final Presentation. SIMS 2002: Fall 2004 Class (2004) (UC Berkeley School of Information Management & Systems) http://www2.sims.berkeley.edu/academics/courses/is202/f04/phone_project/Group4/PicturePortal.ppt May 7, 2010.

Ames, M.; Dennis, T.; Hill, B.; Poon, S.; Wooldridge, M. PicturePortal Website (2004) http://www2.sims.berkeley.edu/academics/courses/is202/f04/phone_project/Group4/ May 7, 2010.

Davis, M., S. King, N. Good, and Risto Serves. From Context to Content: Leveraging Context to Infer Media Metadata. Proceedings of the 12th annual ACM international conference on Multimedia (Oct. 10-14, 2004). pp. 188-195.

Manguy, L., S. Fisher, J. Parada, c. Burgener, C. Madhwacharyuia, J. Antin. iTour Final Presentation from Project Group # 6. SIMS 202: Fall 2004 Class (UC Berkeley School of Information Management & Systems) http://www2.sims.berkeley.edu/academics/courses/is202/f04/phone_project/Group6/iTour%20Slides.ppt Dec. 29, 2009.

Mitnick, S., C. Nigro, P. Poling, D. Thaw, S. Yardi. Pillbox Final Presentation from Project Group #8. SIMS 202: Fall 2004 Class (UC Berkeley School of Information Management & Systems). http://www2.sims.berkeley.edu/academics/courses/is202/f04/phone_project/Group8/presentation.php Dec. 29, 2009.

Official Action issued in connection with U.S. Appl. No. 11/600,670 mailed Mar. 31, 2011.

Official Action issued in connection with U.S. Appl. No. 11/600,670 mailed Sep. 21, 2010.

Official Action issued in connection with U.S. Appl. No. 11/600,670 mailed May 12, 2010.

Official Action issued in connection with U.S. Appl. No. 11/600,670 mailed Jan. 14, 2010.

\* cited by examiner

METHOD AND SYSTEM FOR LOCATING EVENTS IN-CONTEXT

FIELD OF THE INVENTION

The present invention relates to the field of Internet applications. In particular, the present invention relates to a method and system for locating events in-context.

BACKGROUND OF THE INVENTION

FIG. 1 illustrates a conventional way of organizing an event via electronic mail. In the example shown in FIG. 1, a user receives a message from a friend reading "Coming to San Francisco on October $1^{st}$. Want to hook up and do something? Let me know what you've got up your sleeve?" In a conventional approach, in order to respond to this request, the user would have to launch a search to determine the events that may be available and what events may be interesting to the user and her friend. This search may be done by searching various websites on the Internet or by searching a local newspaper. In either approach, the user needs to switch software applications (from mail program to browser) or to change media (from on-line to hard copy) that causes the search to be less efficient. The task would require the user to visit multiple websites or to read through many pages of newspapers. This conventional method for locating events is time-consuming and the results produced are individual results, not aggregated results.

Therefore, there is a need for a method and system that can assist the user in locating events in accordance with the context of the request received.

SUMMARY

The present invention relates to a method and computer program product for locating events in-context over the Internet. In one embodiment, the method includes receiving a document from a user, wherein the document comprises one or more attributes, analyzing the one or more attributes of the document in accordance with a set of contextual information to generate one or more search terms, searching for events related to the one or more attributes of the document using the one or more search terms, and presenting the events to the user.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

Like numbers are used throughout the figures.

DESCRIPTION OF EMBODIMENTS

Method and system are provided for locating events in-context. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
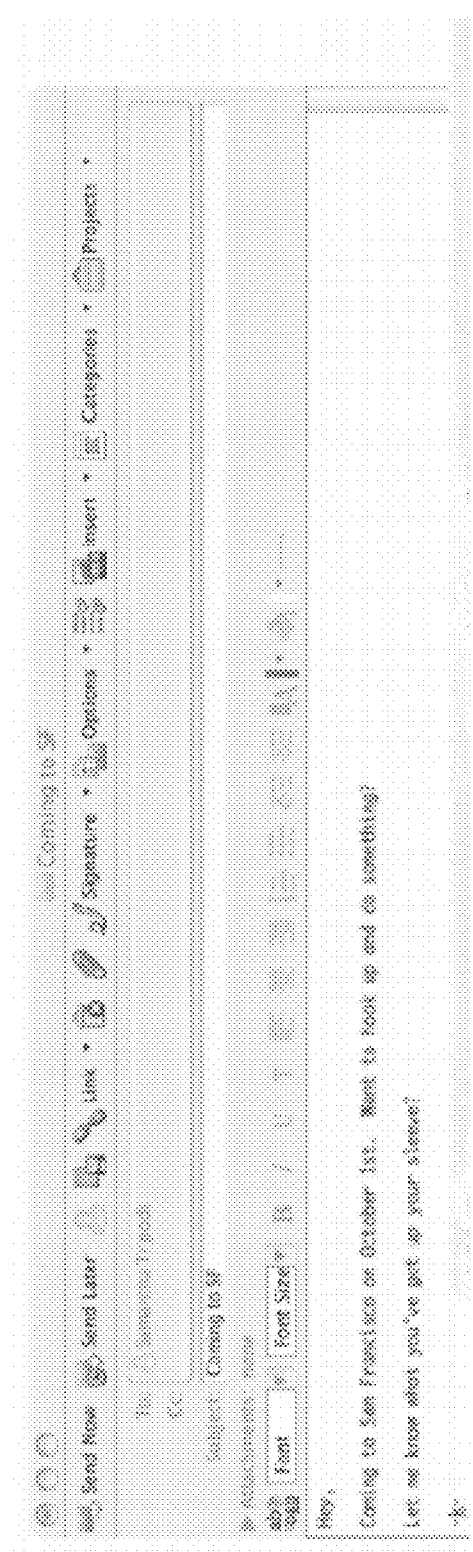
FIG. 1 illustrates a conventional way of organizing an event via electronic mail.
Figure 2A:
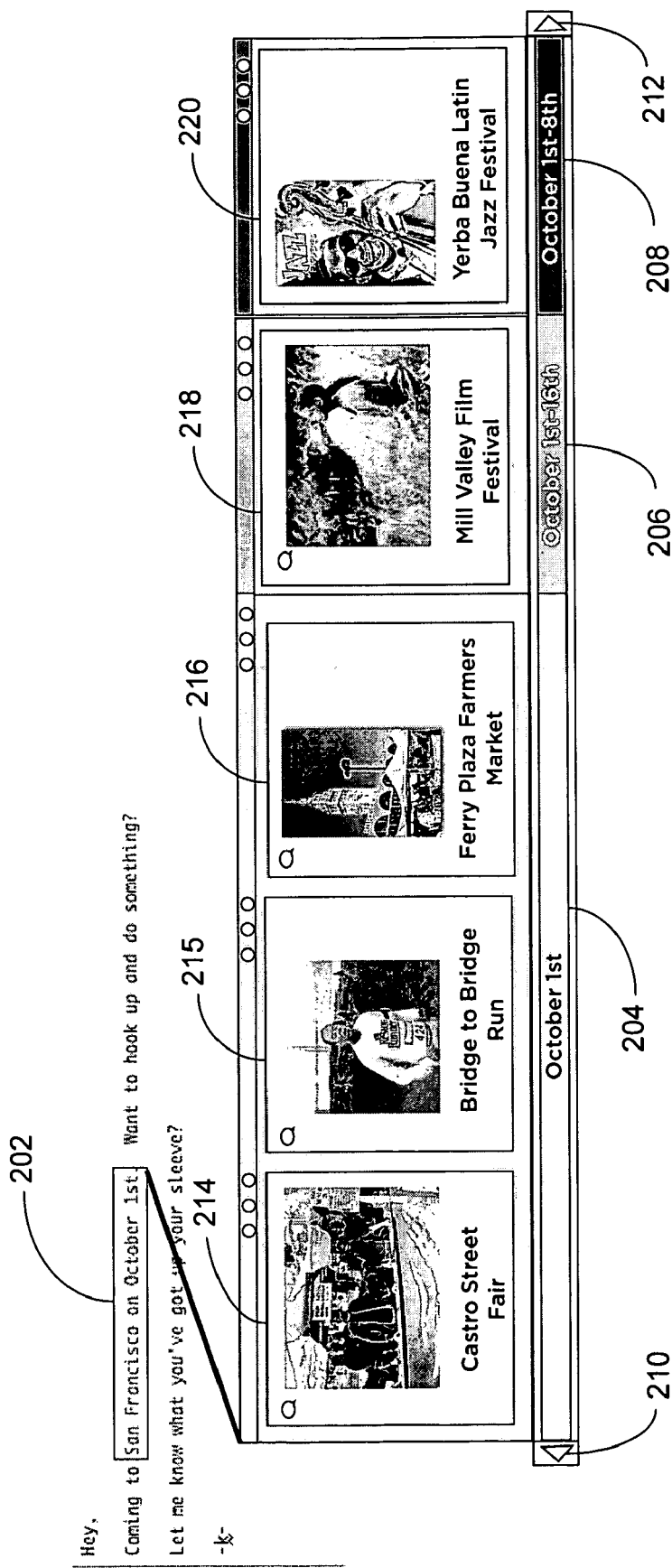
FIGS. 2A-2C illustrate a method for locating events in-context according to embodiments of the present invention.
Figure 2B:
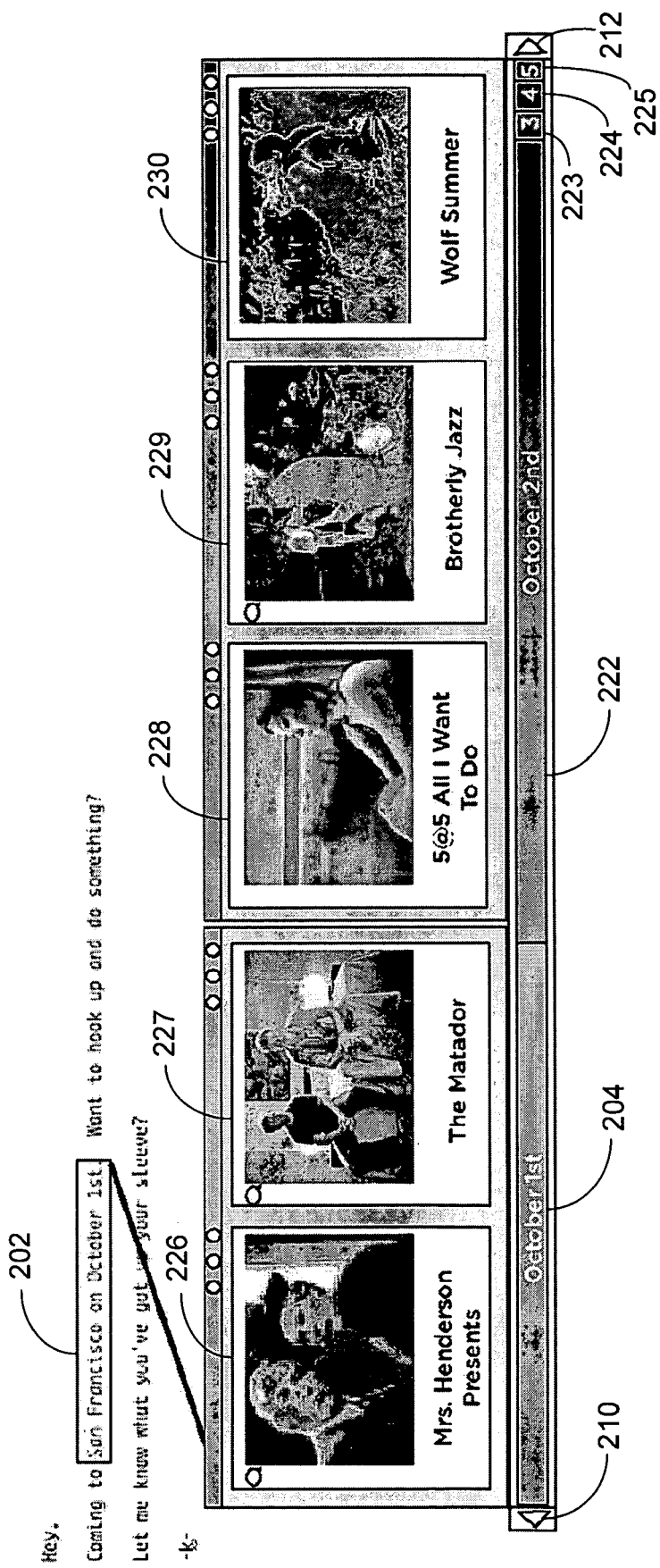
Figure 2C:
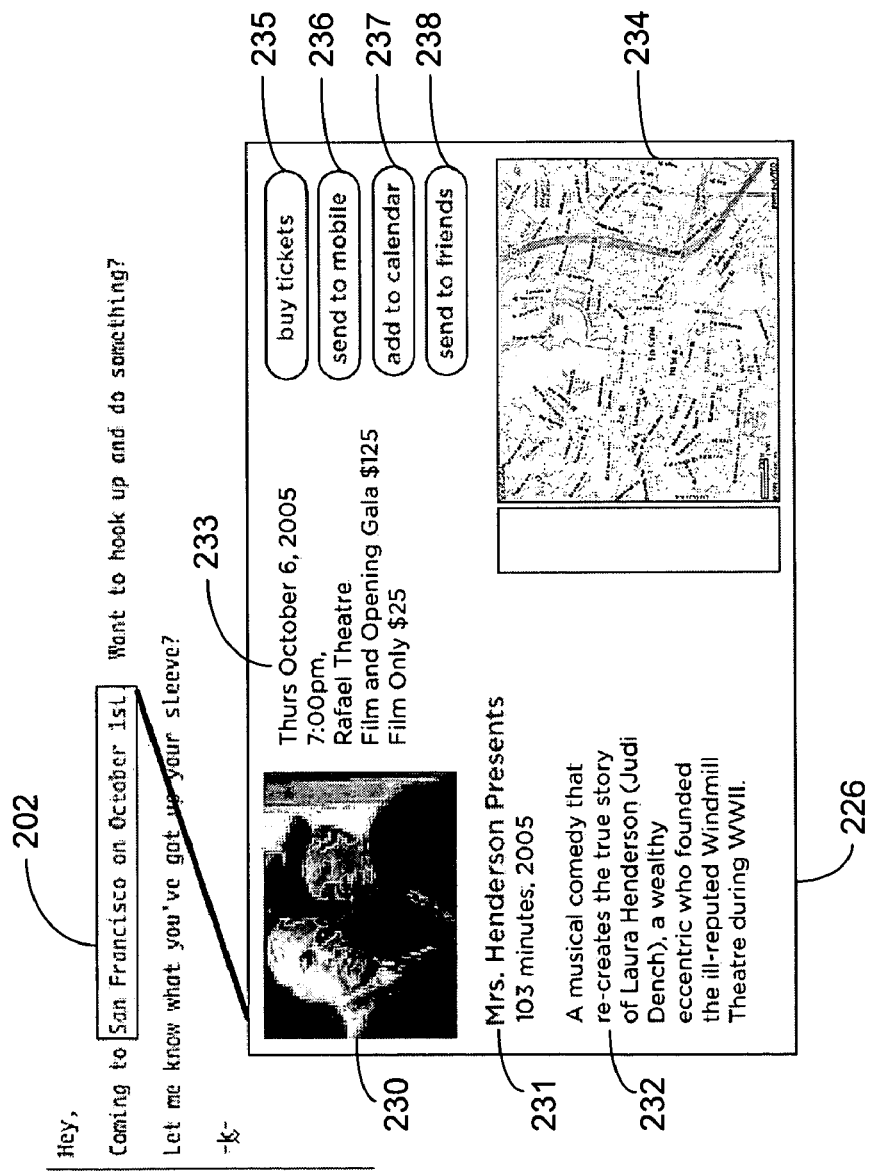

FIGS. 2A-2C illustrate a method for locating events in-context according to embodiments of the present invention. As shown in FIG. 2A, a message is presented with the key words "San Francisco on October $1^{st}$" being highlighted. A contextual event locator uses the information provided by the message to search in-context events occurring in San Francisco around October $1^{st}$. As a result of this search, a series of events can be presented to the user for review. For example, the series of events may be arranged by the date of their occurrences, such as October $1^{st}$ (204), October $1^{st}$-$16^{th}$ (206), and October $1^{st}$-$8^{th}$ (208). Navigational buttons such as 210 and 212 may be used to navigate to the events based on the date given (October $1^{st}$) in the context of the email request. Specifically, information about the events may be provided to the user. For example, events for October $1^{st}$ include the Castro Street Fair (214), the Bridge to Bridge Run (215), and the Ferry Plaza Farmers Market (216). Events between October $1^{st}$ and $16^{th}$ include the Mill Valley Film Festival (218), and events between October $1^{st}$ and $8^{th}$ include the Yerba Buena Latin Jazz Festival. In other embodiments, information about an event may include venue, dates, ticket availability, or other data that would enrich the user experience in browsing an event entry.

In this example, the user highlights the location (San Francisco) and the date (October $1^{st}$). In other implementations, attributes contained in the document (the email message in this case) may be extracted automatically. With such attributes and the corresponding contextual information, a query is preformed against a database of events, sorted by location, dates, genres, etc. Note that this query may be rather complex, such as giving the user the options of watching a movie on October $1^{st}$ or seeing Broadway show during the weekend while she is in San Francisco. In one approach, the contextual event locator may conduct an analysis of what the user is viewing and extract contextual information such as who, where, what, when, how, duration, author, creator and other useful contextual information. With such extracted contextual information, the contextual event locator is able to present information in context regarding all the events that matched San Francisco and that date. Compared to the conventional method that requires the user to go to a search site and conduct a manual search, the contextual event locator removes such manual steps and presents the user with a range of choices of events in response to the user simply highlighting a portion of the message. The user may then continue to narrow the choices by selecting an event of interest. Note that the message received from the user may be in any format, such as text, map, calendar, image, graphics, URL, audio, or video. In addition, the contextual information may include when, who, where, and what derived from the email message. The contextual information may further include information about the sender and receiver of the email message, for example, the types of events they have seen together in the past, the types of DVD movies or books the sender and receiver have purchased, etc.

FIG. 2B illustrates another presentation of a series of in-context events according to an embodiment of the present invention. In this example, events for October $1^{st}$ (204) and October $2^{nd}$ (222) are shown. Additional user interface for accessing events on October $3^{rd}$ (223), October $4^{th}$ (224), and October $5^{th}$ (225) are provided. Similar to FIG. 2A, navigational buttons such as 210 and 212 may be provided to the user to navigate to the events before and after the date of interest (October $1^{st}$) in the context of the email request.

As shown in FIG. 2B, the contextual event locator not only presents the user with a list of events that are going on in San Francisco, but also gives the user capability to browse the events in context and get further details about the events of interest. In other words, the user may drill down to a more detailed level while browsing, and the UI supports navigation based on the criteria both in the original mail and additional refiners delivered in the search results. In this example, if the user selects Mill Valley Film Festival (218 shown in FIG. 2A), five events are shown to the user. Events occurring on October $1^{st}$ include Mrs. Henderson Presents (226) and The Matador (227), and events occurring on October $2^{nd}$ include 5@5 All I Want To Do (228), Brotherly Jazz (229), and Wolf Summer (230).

FIG. 2C illustrates an expanded view of an event according to an embodiment of the present invention. When the user clicks on the show Mrs. Henderson Presents (226) in FIG. 2B, an expanded view of this event is shown as in FIG. 2C. In FIG. 2C, the expanded view of the show includes an image thumbnail of the show 230, title, time, and year (231), and a brief description of the story of the show (232). In addition, the expanded view further includes date, time, prices of the show, and the name of the location (233). Furthermore, a map of the venue is provided (234). The user is given the options to a) buy tickets (235), b) send to mobile (236), c) add to calendar (237), and d) send to friends (238). Note that, in this example, the user has not left the original email application while reviewing and locating events of her interest. After the user closes the pop-up displays (as shown in FIGS. 2A, 2B, and 2C), she may continue to read mail in the mail application. The process of locating events is conducted in the context of the original email message.

Figure 3A:
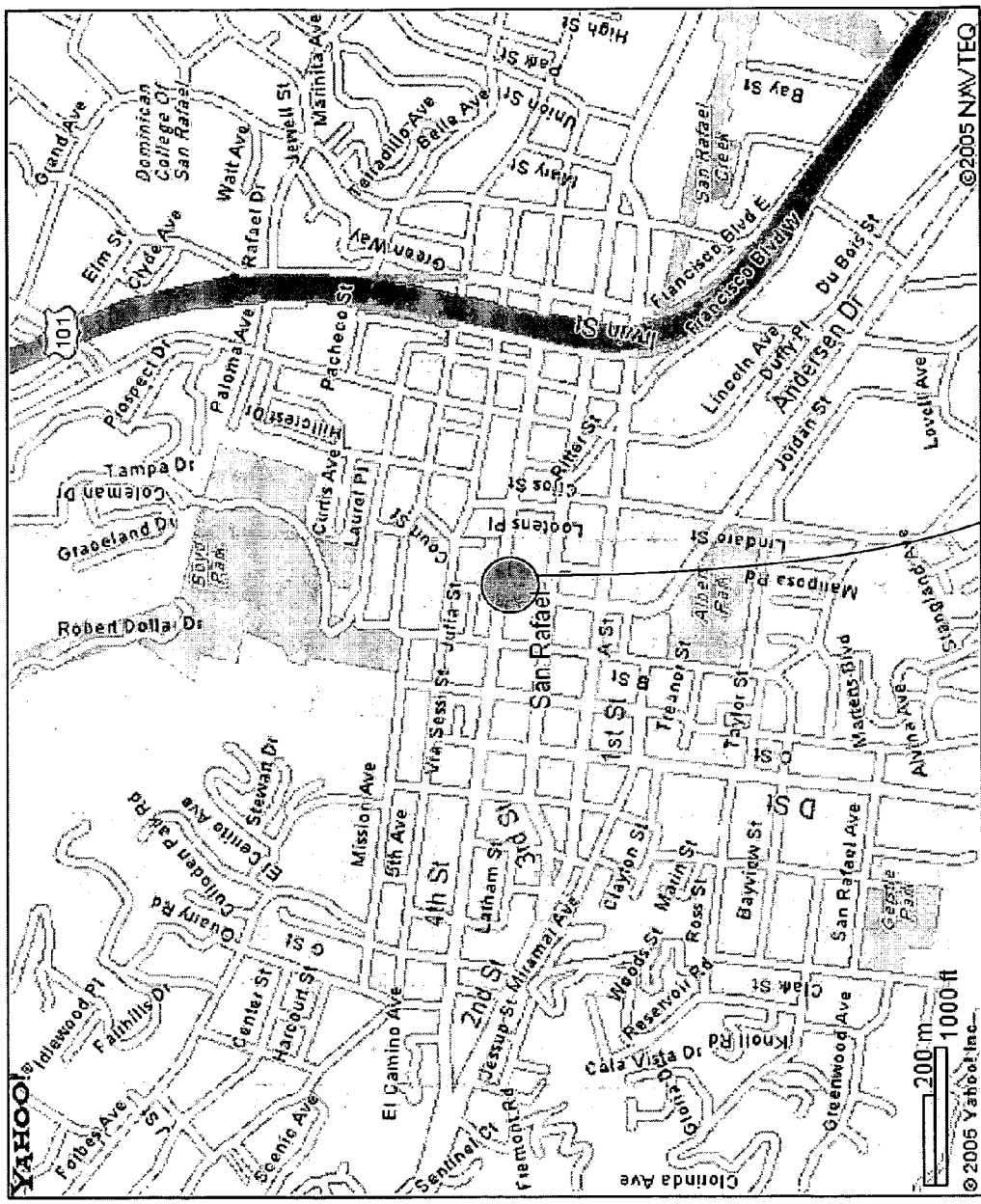
FIGS. 3A-3C illustrate a method for locating events in-context via a map according to embodiments of the present invention.
Figure 3B:
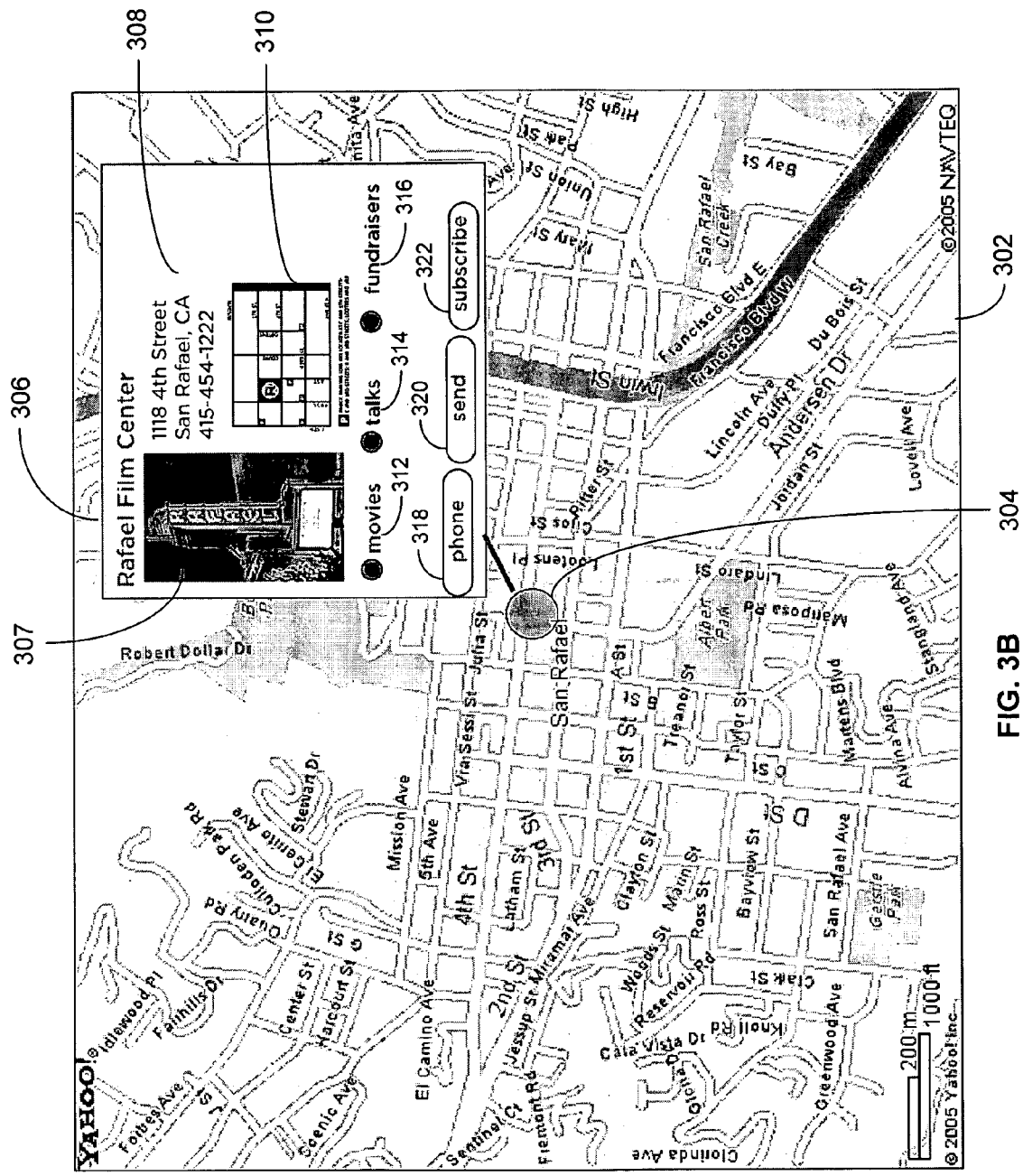
Figure 3C:
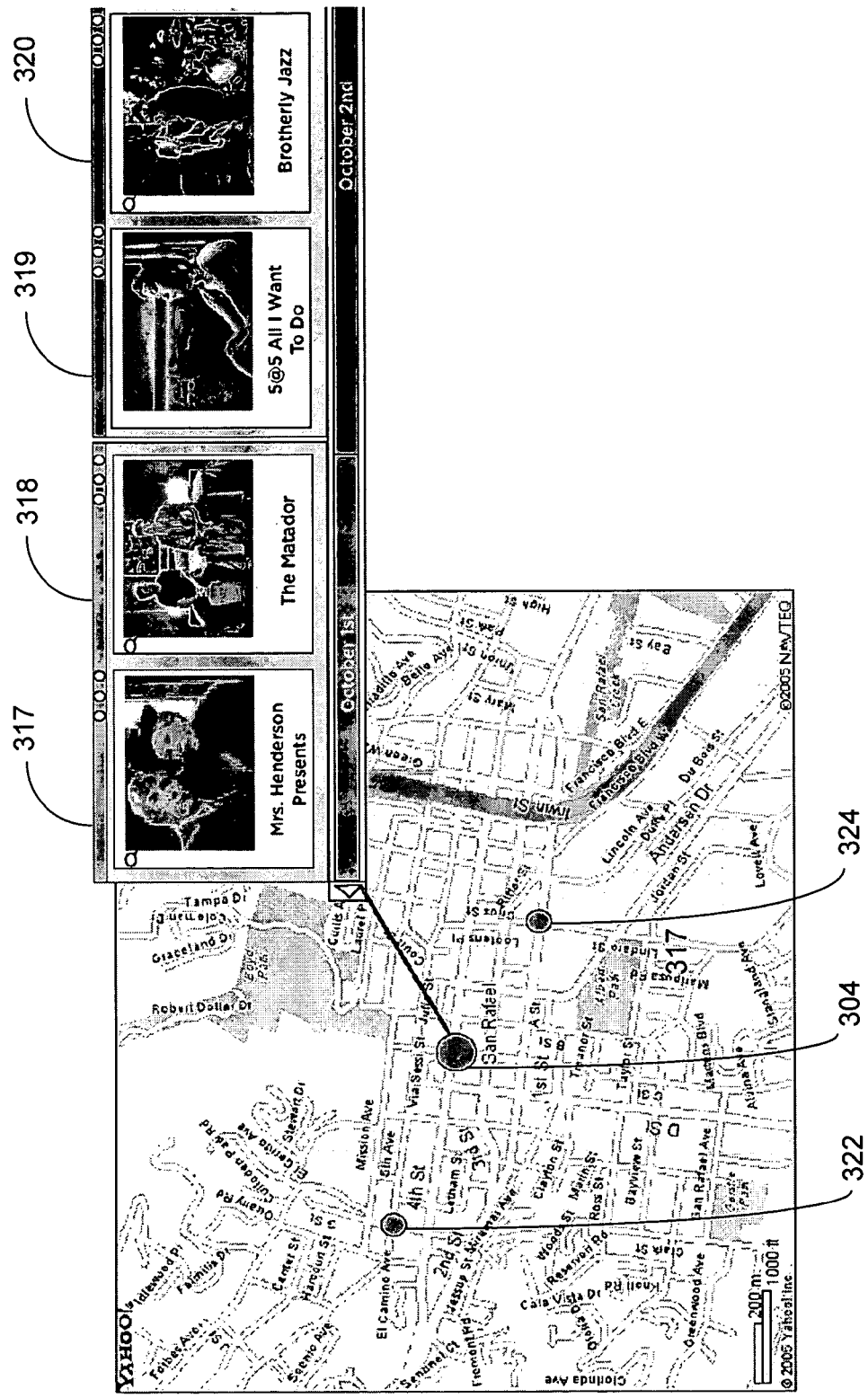

FIGS. 3A-3C illustrate a method for locating events in-context via a map according to embodiments of the present invention. In this example, the map is a provider of contextual information, namely a location. When using the map, the user begins with a location defined by a latitudinal and longitudinal coordinate, and all data or requests for data are encompassed within that location. In FIG. 3A, the user starts out with a map 302 and desires to go to the movies. The user simply highlights a location on the map, for example San Rafael 304. In response, the contextual event locator shows the user information about the Rafael Film Center as shown in FIG. 3B. In other embodiments, the method may be applied in different context, such as a date in a calendar, etc. Note that different context provides different pieces of the event query.

FIG. 3B illustrates a view representing an event venue according to an embodiment of the present invention. When the user clicks on the location of the event venue, a user interface including a window (306) is displayed to provide additional information about the event venue. For instance, the additional information includes a thumbnail image (307) representing the Rafael Film Center, an address and phone number (308) of the venue, and a simplified map (310) showing the location of the venue. Information associated with the location Rafael Film Center, such as movies (312), talks (314), and fundraisers (316), are made available to the user for locating events in-context. In addition, methods of user communication are provided. The user may use the phone button (318) to purchase tickets to the event, or use the send button (320) to send the information to a friend, or use the subscribe button (322) to subscribe to future communications from the Rafael Film Center.

FIG. 3C illustrates a method for presenting events occurring near an event venue according to an embodiment of the present invention. In this example, when a user clicks on the Rafael Film Center, events currently showing at this location are presented to the user, namely Mrs. Henderson Presents (317), The Matador (318), 5@5 All I Want To Do (319), and Brotherly Jazz (320). In this case, the contextual event locator knows enough about the fact that there are actually two other movie theaters 322 and 324 that exist in the vicinity of San Rafael. The user may click on these locations to find out more about the movies being shown there. In other implementations, when the user clicks on the Rafael Film Center, all movies showing at this location and at the other two locations are shown to the user, without having the user to select the two nearby locations. Thus, the contextual event locator takes contextual information based on the user's intent, and then overlays the information on a medium the user is currently working with, whether it is an email message as shown in FIGS. 2A-2C or a map as shown in FIGS. 3A-3C.

Figure 4:
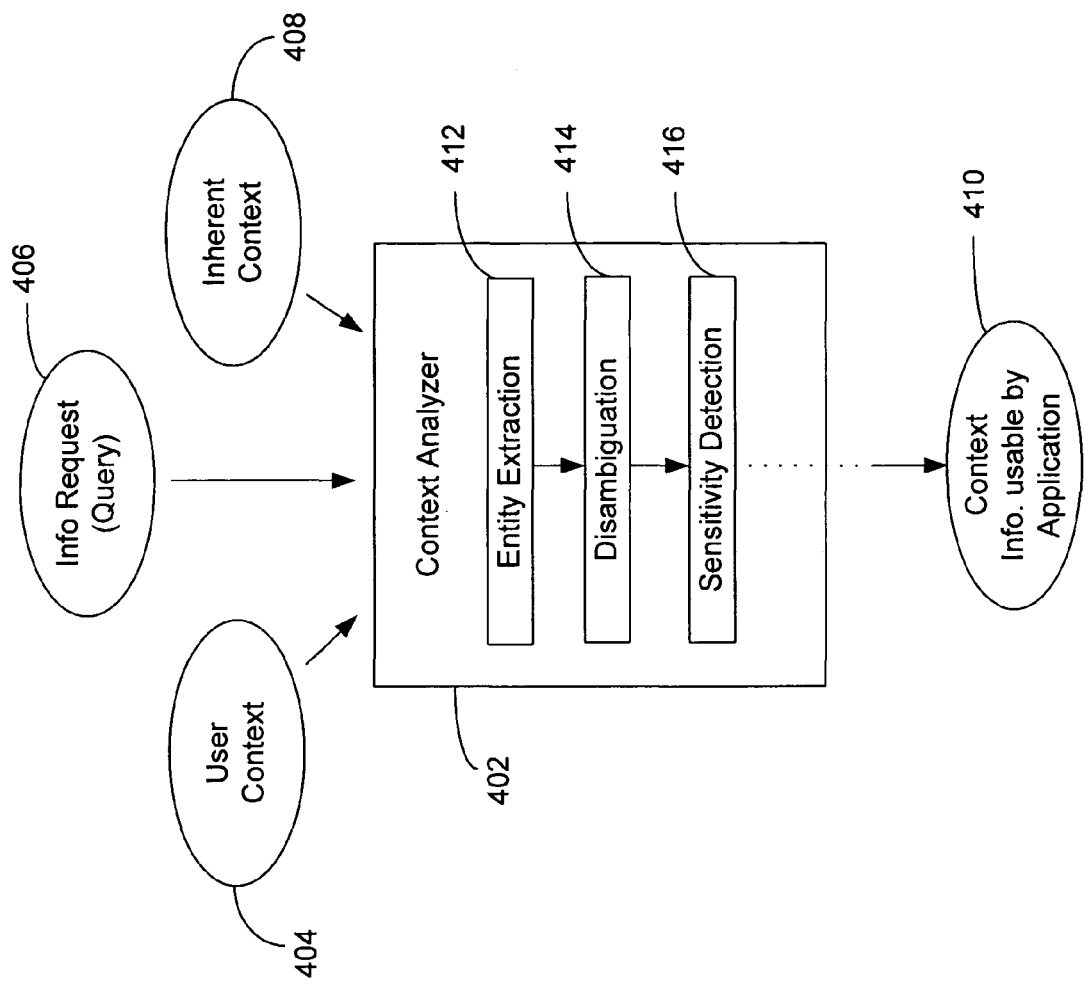
FIG. 4 illustrates a method of analyzing contextual information according to an embodiment of the present invention.

FIG. 4 illustrates a method of analyzing contextual information according to an embodiment of the present invention. As shown in FIG. 4, a context analyzer (402) receives contextual input from various sources, including user context (404), search query (406), and inherent context (408), to generate contextual information to be used by the application (410) for conducting the searching and displaying of in-context events. The context analyzer includes three main functions, namely entity extraction (412), disambiguation (414), and sensitivity detection (416), for refining the parameters of the search query. The entity extraction function (412) extracts the entity of the search term based on contextual information such as time, date, location, artist, venue, etc. The disambiguation function (414) disambiguates certain search terms according to the context of the search. For example, the term Jaguar may refer to the car, the operating system, or the professional football team. If the user is trying to locate a sports event, then the term Jaguar is more likely to mean the professional football team. The sensitivity detection function (416) determines how precise a particular search term needs to be. For example, whether exact spelling of the term is required or sound-alike terms are also acceptable. In this example, the user context (404) may include user behavior, user preferences, user environment, etc. In addition, the user context (404) may be derived from the user's interactions with the application, such as a history of websites or links reviewed by the user. The application may use such user interactions to identify information that would best fit with the intent or interest of the user. The application may also use the information from the user interaction to provide additional selections to assist the user with further searches.

Figure 5:
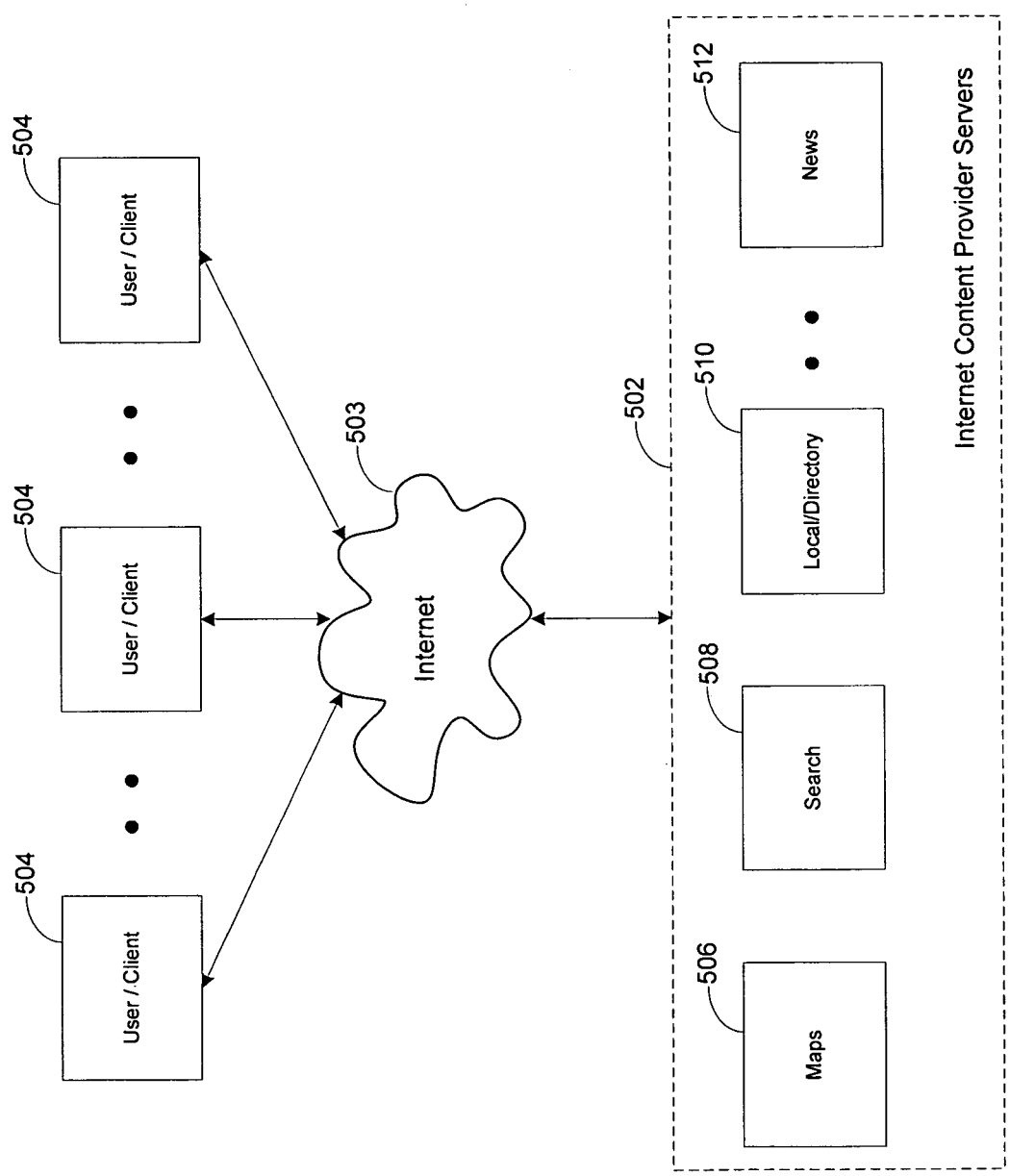
FIG. 5 illustrates a system for locating events in-context according to an embodiment of the present invention.

FIG. 5 illustrates a system for locating events in-context according to an embodiment of the present invention. The system includes one or more Internet content provider servers 502, databases (not shown), and one or more users/clients 504. The servers 502 interface with the clients 504 via a communication network 503. The Internet content provider servers 502 are host servers operable to provide content to clients 504 via the network 503. One or more of the servers host websites and include the map functions. The databases are operable to store data provided by the servers 502 and/or clients 504. The databases can communicate with the servers 502 or clients 504 via the network 503. The databases can store data items included in the web pages, such as maps and user information.

Alternatively, the servers 502 may include the databases, processors, switches, routers, interfaces, and other components and modules. Each of the servers 502 may comprise one or more servers, or may be combined into a fewer number of servers than shown, depending on computational and/or distributed computing requirements. The servers 502 may be located at different locations relative to each other. The databases may also be separately connected to the servers 502. There may be more or fewer than two databases, depending on computational and/or distributed computing requirements. The databases may be located at different locations relative to each other and the servers 502.

Each of the clients 504 may be a general-purpose computer, such as a personal computer, having a central processing unit (CPU), a memory, an input device, an output device, and a display. Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented as the clients 504. Each of the clients 504 may also implement analog and digital baseband circuitry, power management circuitry, a radio frequency (RF) transceiver, and battery interface and charging circuitry. Clients 504 may include one or more applications, program modules, and/or sub-routines. As an example, clients 504 may include a browser application (e.g., Internet Explorer, etc.) and a graphical user interface (GUI) to access websites and web pages provided by the servers 502 and data stored at the databases. Clients 504 may be remote from each other, the servers 502, and/or the databases.

The network 503 is a communications network, such as a local area network (LAN), a wide area network (WAN), or the Internet. When the network 503 is a public network, security features (e.g., VPN/SSL secure transport) may be included to ensure authorized access within the system.

The servers 502 further include a plurality of individual domains, for example, Maps domain 506, Search domain 508, Local/Directory domain 510, News domain 512, and other domains. A domain is a computer system implemented with different hardware and software for a specific application, such as the maps application, news application, and search application. The contextual event locator may reside inside the Yahoo Local or Yahoo! Directory domains according to an embodiment of the present invention. The contextual event locator may analyze and search the large repository of event information in the Yahoo! Local and Yahoo! Directory in order to find the in-context events for the user. The contextual event locator applications of the present invention may be implemented in the Local/Directory domain 510, which implements Web 2.0 functionalities using a combination of HTML, CSS, JavaScript, and "Asynchronous JavaScript and XML" (AJAX). In particular, JavaScript is used to create, monitor, change, and destroy objects and change the state of the various objects, in addition to keeping track of browser behavior changes initiated by the user. In other embodiments, the contextual event locator may be implemented as a plug-in of an application, as an XML application, or as an embedded application of the operating system.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for locating and presenting events in-context comprising:

automatically extracting, by a computing device, attributes from at least a portion of an electronic document associated with a user;

obtaining, by the computing device, a set of contextual information, the set of contextual information comprising contextual information selected from a group of contextual information types consisting of user behavior, user preferences, and user environment;

analyzing, by the computing device, the attributes and the set of contextual information to cause generation of one or more search terms;

analyzing, by the computing device, context of the attributes of the document, where the context of the attributes includes sender and receiver of the document, location, time, and theme of the events to be searched;

generating, based on the analyzing steps, the one or more search terms;

determining, by the computing device, search results for events based on the one or more search terms; and causing, by the computing device, a display of the search results simultaneously with at least a portion of a display of the electronic document.

2. The method of claim 1, wherein the electronic document comprises an electronic document selected from a group of electronic document types consisting of text, image, graphics, URL, map, calendar, audio, and video.

3. The method of claim 1, wherein the causing of the display of the results comprises:

causing a display of the events in accordance with a type of data to be displayed; and causing a display of a personalized view of the events to be displayed.

4. The method of claim 1, wherein the causing of the display of the results comprises:

causing a display of event venues dynamically in accordance with changes to the document; and causing a display of a representation of additional selections of events to the user for conducting further searches.

5. The method of claim 1, wherein the causing of the display of the results comprises:

causing a display of a user interface for conducting transactions, including purchasing tickets to the events.

6. A non-transitory computer readable storage medium for locating events over a network, comprising computer programs for execution by one or more computer systems, the computer readable storage medium comprising:

code for automatically extracting attributes from at least a portion of an electronic document associated with a user;

code for obtaining a set of contextual information, the set of contextual information comprising contextual information selected from a group of contextual information types consisting of user behavior, user preferences, and user environment;

code for analyzing the attributes and the set of contextual information to cause generation of one or more search terms;

code for analyzing context of the attributes of the document, where the context of the document includes sender and receiver of the document, location, time, and theme of the events to be searched;

code for generating, based on the analyzing steps, the one or more search terms;

code for determining search results for events based on the one or more search terms; and code for causing a display of the search results simultaneously with at least a portion of a display of the electronic document.

7. The non-transitory computer readable storage medium of claim 6, wherein the electronic document comprises an electronic document selected from a group of electronic document types consisting of text, image, graphics, URL, map, calendar, audio, and video.

8. The non-transitory computer readable storage medium of claim 6, wherein the code for causing a display of the results comprises:

code for causing a display of the events in accordance with a type of data to be displayed; and code for causing a display of a personalized view of the events to be displayed.

9. The non-transitory computer readable storage medium of claim 6, wherein the code for causing a display of the results comprises:

code for causing a display of event venues dynamically in accordance with changes to the document; and code for causing a display of additional selections of events to the user for conducting further searches.

10. The non-transitory computer readable storage medium of claim 6, wherein the code for causing a display of the results further comprises:

code for causing a display of a user interface for conducting transactions, including purchasing tickets to the events.

* * * * *